(12) United States Patent
Svensson

(10) Patent No.: US 7,094,005 B2
(45) Date of Patent: Aug. 22, 2006

(54) SHANK MILLING CUTTER HAVING A WIPER RADIUS

(75) Inventor: Jonas Svensson, Solihull (GB)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/007,235

(22) Filed: Dec. 9, 2004

(65) Prior Publication Data

US 2005/0186037 A1     Aug. 25, 2005

Related U.S. Application Data

(63) Continuation of application No. PCT/EP03/05389, filed on May 23, 2003.

(30) Foreign Application Priority Data

Jun. 10, 2002    (DE)    ................... 102 25 481

(51) Int. Cl.
*B23P 15/34*    (2006.01)
(52) U.S. Cl. .............. 407/53; 407/54; 407/62
(58) Field of Classification Search .............. 407/53, 407/54, 30, 60, 62; 409/132
See application file for complete search history.

(56) References Cited

U.S. PATENT DOCUMENTS

| | | | |
|---|---|---|---|
| 3,775,819 A | 12/1973 | Ribich | |
| 4,300,862 A | 11/1981 | Yada | |
| 5,087,159 A | 2/1992 | Thomas | |
| 5,513,931 A | 5/1996 | Reiterman et al. | |
| 6,439,811 B1 * | 8/2002 | Wardell | 407/54 |
| 6,719,501 B1 * | 4/2004 | Sekiguchi et al. | 407/63 |
| 6,899,494 B1 * | 5/2005 | Walrath | 407/54 |

FOREIGN PATENT DOCUMENTS

| | | |
|---|---|---|
| DE | 100 52 963 | 5/2002 |
| JP | 06-126521 | 5/1994 |
| JP | 09-309020 | 12/1997 |
| JP | 11-156620 | 6/1999 |

* cited by examiner

*Primary Examiner*—Willmon Fridie, Jr.
(74) *Attorney, Agent, or Firm*—Drinker Biddle & Reath LLP

(57) ABSTRACT

A shank milling cutter includes a cutting portion which is intended to come into engagement with the workpiece, wherein the envelope surface of the cutting portion is substantially cylindrical. At least one major cutting edge is arranged at the peripheral surface of the cutting portion and at least one minor cutting edge (face cutting edge) is arranged at the end face of the cutting portion and with an end diameter D. The minor cutting edge, in projection onto a plane containing the milling cutter axis, has a convexly curved portion with a radius of curvature R>D/2 and a center of curvature M located such that a distance from the center of curvature M to the axis is in a range from zero to a value smaller than D/2.

15 Claims, 2 Drawing Sheets

SHANK MILLING CUTTER HAVING A WIPER RADIUS

This application is a continuation of International Application Serial No. PCT/EP03/05389 filed on May 23, 2003, and which claims priority of Patent Application Serial No. 102 25 481.8 filed in Germany on Jun. 10, 2002.

BACKGROUND

The present invention concerns a shank milling cutter preferably for performing end milling operations.

Milling is a cutting machining process using a rotating tool. In that procedure the cutting edges produce the cutting movement by virtue of their rotation about the central axis of the tool. The advance movements can take place in various directions. They are effected by the tool or by the workpiece or even by both. In contrast to turning and drilling, the cutting edges are not constantly in engagement. After a cut on the workpiece they are returned in the disengaged condition to the point of first cut. As a result they can cool down and discharge the chips from the chip spaces.

In principle a distinction is made between three different milling cutting processes: peripheral milling, end milling and end-peripheral milling. Peripheral milling, also referred to as hob milling, is a milling process in which the major cutting edges which are at the periphery of the tool generate the desired workpiece surface; the milling cutter axis therefore extends parallel to the working surface and perpendicularly to the advance direction of the milling cutter. In the end milling process the desired workpiece surface to be produced is that to which the milling cutter axis is perpendicular and in that case the advance direction of the milling cutter is parallel to the workpiece surface produced. In that case however essential chip removal is also effected primarily with the major cutting edges arranged at the peripheral surface. The minor cutting edges which are at the end of the tool smooth the milled surface and thus produce the workpiece surface. Finally, in end-peripheral milling, both the major and also the minor cutting edges produce the desired workpiece surfaces.

Relatively high-grade surfaces can be produced by means of end milling. In that respect, the minor cutting edges are solely responsible for the surface produced. They move in one plane and not on a curved working surface like the major cutting edges which generate the workpiece surface in peripheral milling. Fine final machining of flat surfaces is possible with suitable end milling cutters.

The general view is that the quality of the particularly flat and smooth surfaces produced by end milling is essentially determined by the cutting edge corner shape and by the orientation of the minor cutting edges.

In order, however, to achieve a high level of surface quality by means of the conventional end milling cutters, the advance speed must be selected to be very low and the machining depth or chip thickness must be selected to be very slight, which in turn results in longer machining times and thus higher costs.

Therefore an object of the present invention is to provide a shank milling cutter with which milling, preferably end milling, can be effected at a high advance speed and a high level of chip removal efficiency with at the same time a high quality in respect of the machined surface.

SUMMARY OF THE INVENTION

According to the invention, that object is attained by a shank milling cutter comprising a cutting portion which is intended to come into engagement with the workpiece, wherein the envelope surface of the cutting portion is substantially cylindrical, at least one major cutting edge arranged at the peripheral surface of the cutting portion and at least one minor cutting edge (face cutting edge) arranged at the end face of the cutting portion and with an end diameter D, characterized in that the minor cutting edge in projection onto a plane containing the milling cutter axis has a convexly curved portion with a radius of curvature R>D/2 and a center of curvature M located such that a distance from the center of curvature M to the axis is in a range from zero to a value smaller than D/2.

More specifically it has surprisingly been found that the quality in terms of final machining of flat surfaces can be markedly improved by the configuration according to the invention of the minor cutting edge with an only slightly curved portion with at the same time a considerably greater advance speed. In that respect the minor cutting edge also contributes a substantial part to the level of chip removal efficiency. Preferably the region which is curved in accordance with the invention has a point which projects furthest forwardly in the axial direction and which first comes into contact with the workpiece when the tool is moved axially toward the workpiece. In other words, the center of curvature may lie on the axis or be spaced from the axis by a distance less than one-half of the end diameter.

That ensures that final machining of the workpiece surface is effected by the portion which is curved in accordance with the invention and not for example by the cutting edge corner.

In end milling, the cutting edge corners and the minor cutting edges generally leave behind arcuate machining traces on the workpiece surface. The arcs are portions of the cycloids which are produced by superimposition of the rotary tool movement and the generally rectilinear advance movement. Those arcs are spaced apart from one another by a distance approximately coinciding with the cutting edge advance. The configuration of the milling cutter in accordance with the invention makes it possible to eliminate the arcuate machining traces. A portion of the minor cutting edge which is curved in accordance with the radius R performs a kind of 'wiper' function or smoothing or dressing function so that machining traces which have possibly occurred due to the cutting edge corner are effectively removed. The end milling cutter according to the invention provides that the advance speed and thus the machining speed can be markedly increased, with an extremely high level of surface quality. Advantageously, the portion which is curved in accordance with the invention is arranged substantially at the side of the minor cutting edge, that is, towards the major cutting edge.

It has been found that the radius of curvature should advantageously be selected to be very large, for example larger than 0.66 D. It will be noted that radii of curvature greater than 800 mm provide practically no further improvement in the quality of the surface, but, by virtue of increased development of heat along the greater region at which the minor cutting edges contact the workpiece, only result in undesired wear of the tool. Therefore, 800 mm represents a suitable maximum upper limit for the radius of curvature which is more preferably less than 500 mm.

It will be appreciated that the curved portion can also comprise a plurality of short straight parts which are in angled relationship with each other.

In a preferred embodiment, the center of the radius of curvature or the center of the notional circle on which is disposed the portion of the minor cutting edge which is curved with the radius R, does not lie on the axis of rotation of the milling cutter. In other words, the spacing S is preferably greater than zero.

At its side towards the major cutting edge, the minor cutting edge extends as perpendicularly as possible in relation to the axis of rotation of the milling cutter shank. In a preferred embodiment the spacing S between the center M and the axis of rotation is greater than, or equal to, D/6, preferably greater than D/4, particularly preferably greater than D/3. That measure provides a further development in the configuration of the minor cutting edge, in regard to particularly good surface machining. Tests have shown that, in principle, the spacing of the center M from the axis of rotation should be as large as possible. It will be noted that the beneficial effect according to the invention is not further boosted with a spacing greater than D/2.

In a further particularly preferred embodiment, a cutting edge corner which is formed by the transition from the major cutting edge to the minor cutting edge has a corner radius which is smaller than D/2. By virtue of that configuration of the cutting edge corner, the longevity of the tool can be markedly improved. In this case also the curvature can be approximated by means of a plurality of short straight parts which are in angled relationship with each other.

As an alternative thereto in another preferred embodiment, the cutting edge corner formed by the transition from the major cutting edge to the minor cutting edge has a bevel which is preferably inclined relative to the plane which extends perpendicularly to the axis of rotation, through an angle of between 30° and 60° and particularly preferably between 40° and 50°.

That measure also enables the cutting edge corner of the shank milling cutter to be treated carefully and gently so that overall the service life of the end milling cutter is increased.

In a particularly preferred embodiment, the minor cutting edge is arranged at a clearance angle of at least 1 degree. Strictly speaking, however, this refers to the region of the minor cutting edge which adjoins the radius curved with the radius R, in the direction of the center of the milling cutter. That measure means that, in a plan view on to the end face, the end milling cutter is inclined conically inwardly.

Tests have shown that, by virtue of the minor cutting edge which is curved with the radius R, the clearance angle can advantageously also be selected to be markedly greater than 1 degree, such as for example between 1.5° and 10°, preferably between 2.5° and 10°. That measure further reduces the contact region between the workpiece and the minor cutting edge so that the milling cutter heats up to a lesser degree during operation and thus the service life can be enhanced.

The shank milling cutter according to the invention is preferably an end milling cutter and the cutting portion thereof advantageously at least partially comprises hard metal, cermet, PCD (polycrystalline diamond), CBN (cubic boronitride) or SiN (silicon-nitride based ceramic).

BRIEF DESCRIPTION OF THE DRAWINGS

Further advantages, features and possible uses of the present invention will be clearly apparent from the description hereinafter of a preferred embodiment and the accompanying drawings in which:

FIGS. 1a–1c show a view of two prior art end milling cutters, wherein:

FIG. 1a is a side elevational view of one prior art end milling cutting;

FIG. 1b is an enlarged fragmentary view of a circled portion of FIG. 1a; and

FIG. 1c is a view similar to FIG. 1b of another prior art end milling cutter.

FIGS. 2a–2c show two embodiments of an end milling cutter according to the invention, wherein:

FIG. 2a is a side elevational view of a first preferred embodiment of an end milling cutter;

FIG. 2b is an enlarged fragmentary view of a circled portion of FIG. 2a; and

FIG. 2c is a view similar to FIG. 2b of a second preferred embodiment of an end milling cutter according to the invention.

DETAILED DESCRIPTION OF PREFERRED EMBODIMENTS

Figure 1C:
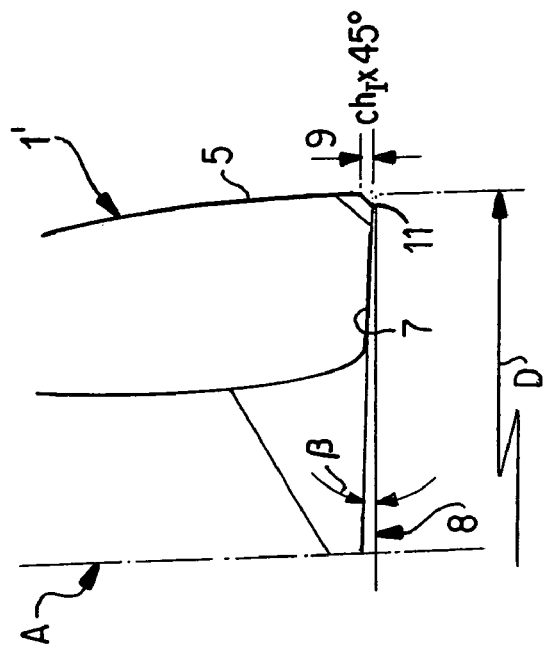
Figure 1B:
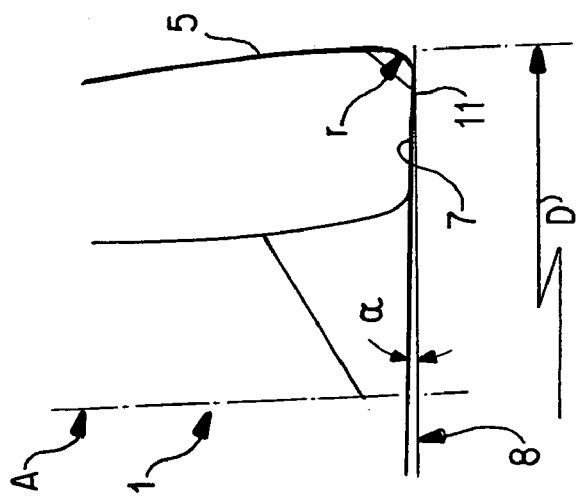
Figure 1A:
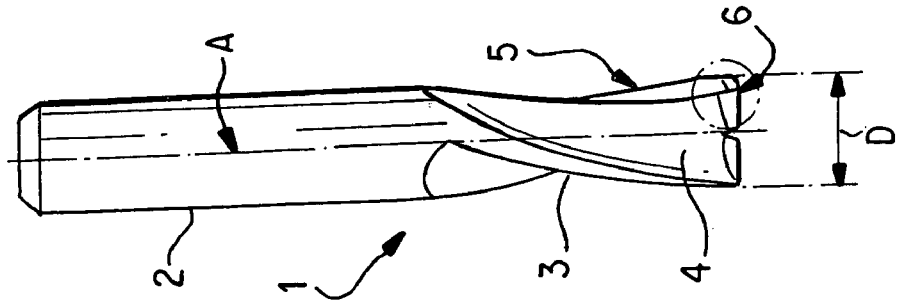

FIG. 1a shows a side view of a prior art end shank milling cutter 1 comprising a shank portion 2 and a cutting portion 3. The shank portion 2 is here in the form of a cylindrical shank. It will be appreciated however that it is also possible to use all other shank shapes, such as for example a Morse taper shank, a steep-angle taper shank, a Weldon shank or a whistle notch shank. Here the cutting portion 3 has two major cutting edges 5 which are separated from each other by two spiral flutes 4. Peripheral surface sections of the cutting portion situated between the flutes define a cylindrical envelope surface of the cutting portion. The major cutting edges are provided at the peripheral surface of the cylindrical cutting portion 3. The end faces of the cutting portion have the minor cutting edges 7. The milling cutter has an end diameter D, as shown in FIG. 1a.

FIGS. 1b and 1c show respective configurations of a circled portion of the cutting edge corner of FIG. 1a.

In the configuration shown in FIG. 1b, the cutting edge corner 6 of milling cutter 1 has a radius of curvature r. The configuration of the milling cutter 1' shown in FIG. 1c differs from that shown in FIG. 1b substantially in that the cutting edge corner 6 is not provided with a radius of curvature r, but rather has a bevel 9. Both measures serve substantially to enable the corner to be treated carefully and gently during a cutting operation, and thus serve to enhance the service life or operating life of the milling cutter 1.

It can be clearly seen from FIGS. 1b and 1c that the minor cutting edge 7 forms a clearance angle α or β with a plane 8 oriented perpendicular to the axis of rotation A of the milling cutter. In the view illustrated in FIGS. 1b and 1c, therefore, there is always a part 11 of the corner which forms the deepest (i.e., axially forwardmost) part of the milling cutter, which engages furthest into the workpiece. Consequently, during an end-milling machining operation, the cutting edge corners or the adjoining minor cutting edges leave behind arcuate machining traces on the workpiece surface. The traces become clearer, as greater tool-advance speeds are adopted (in the case of end milling cutters the advance direction is in perpendicular relationship to the axis of rotation of the milling cutter).

Figure 2A:
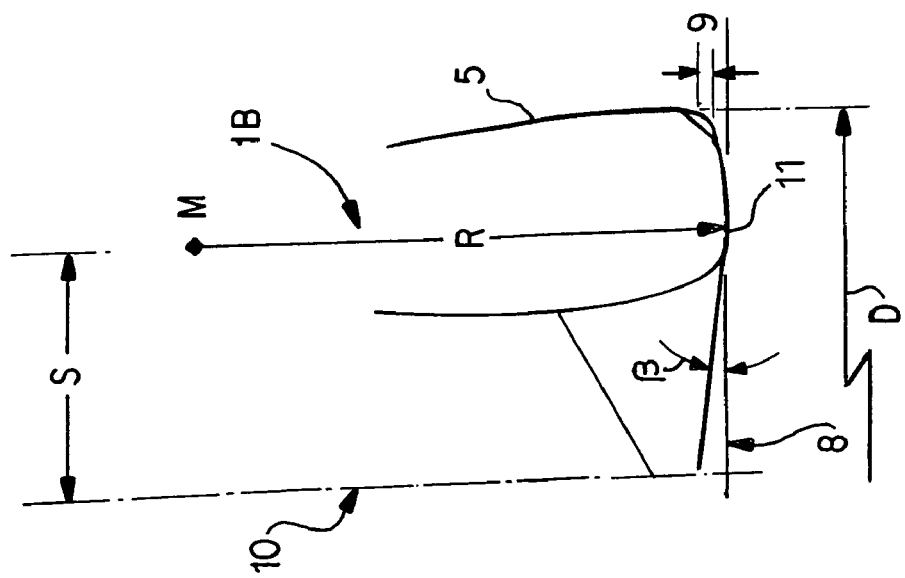
Figure 2B:
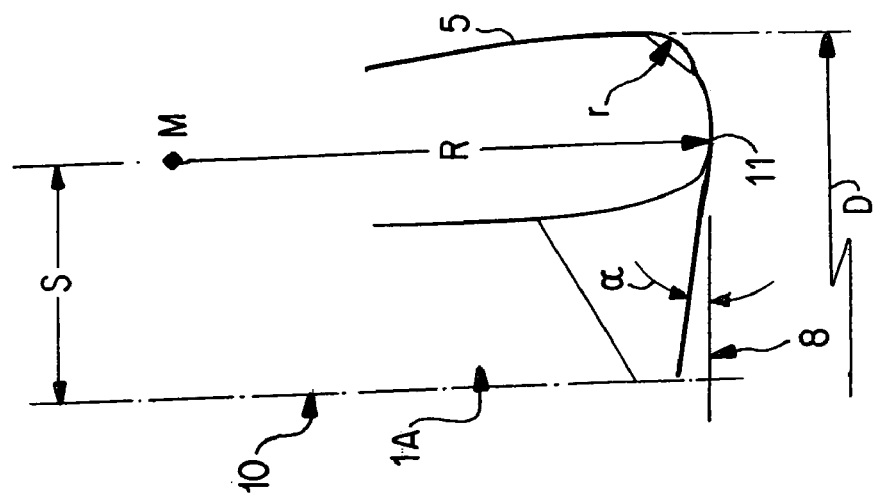
Figure 2C:
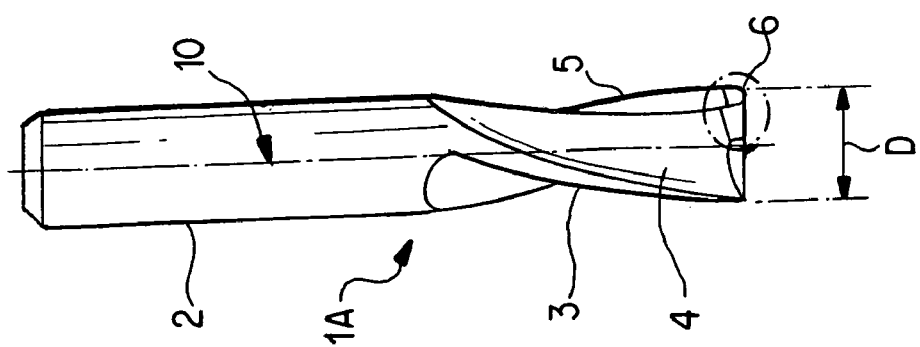

FIGS. 2a to 2c show views of preferred embodiments of milling cutters according to the invention.

FIG. 2a substantially corresponds to FIG. 1a. In this case also the milling cutter 1A comprises a shank portion 2 and a cylindrical cutting portion 3 which has a plurality of, and in the illustrated example, two major cutting edges 5 and a plurality of, and in the illustrated example, two minor cutting edges 7.

The configuration, according to the invention, of the minor cutting edge 7 becomes clear in the detail views on an enlarged scale in FIG. 2b and FIG. 2c. In this case also FIGS. 2b and 2c substantially differ from one another in that the cutting edge corner of the milling cutter 1A is provided with a radius of curvature R, but the milling cutter 1B is provided with a bevel 9 which is inclined by 45° with respect to the plane 8 perpendicular to the axis of rotation. Provided at the cutting edge corner 6 in the direction of the axis of rotation 10 is a curved portion of the minor cutting edge, having a relatively large radius of curvature R. The center of curvature M from which the radius of curvature R is measured could lie on the axis 10, but is preferably spaced therefrom by an offset distance S as depicted. The value S is shown here as being more than a third of the end diameter D. The radius R is greater than half the end diameter D, while for example the radius of curvature r of the cutting edge corner is markedly smaller than half the end diameter D.

In particular, it can be seen from FIGS. 2b and 2c that now the deepest (i.e., axially forwardmost) part 11 of the minor cutting edge is no longer located at the region of the cutting edge corner 6 but rather is remote from the corner due to the radius R. The consequence of this is that the arcuate machining traces which usually occur in end milling are not produced. It can also be clearly seen from FIGS. 2b and 2c in comparison with FIGS. 1b and 1c that the clearance angle α or β, that is to say the inclination of the minor cutting edge 7 with respect to the reference plane 8 perpendicular to the axis of rotation 10, can be markedly greater.

The shank milling cutter according to the invention for end milling enables the advance speed to be increased in comparison with known end milling cutters without a deterioration in the quality of the surface to be machined.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A shank milling cutter comprising a shank portion and a cutting portion disposed forwardly of the shank portion; an envelope surface of the cutting portion being substantially cylindrical and defining an axis of rotation of the cutter; at least one major cutting edge extending in a generally front-to-rear direction along an outer periphery of the cutting portion; at least one minor cutting edge disposed at a front end face of the cutting portion; the front end face defining an end diameter D; the minor cutting edge being convexly curved and having a radius of curvature R about a center of curvature situated rearwardly of the front end face, wherein $R > D/2$ and wherein a distance S from the center of curvature to the axis is in a range $0 < S < D/2$.

2. The shank milling cutter according to claim 1 wherein $R > 0.66\,D$.

3. The shank milling cutter according to claim 1 wherein $R < 800$ mm.

4. The shank milling cutter according to claim 1 wherein $R < 500$ mm.

5. The shank milling cutter according to claim 1 wherein S is at least equal to $D/6$.

6. The shank milling cutter according to claim 1 wherein $S > D/4$.

7. The shank milling cutter according to claim 1 wherein $S > D/3$.

8. The shank milling cutter according to claim 1 wherein a transition from the minor cutting edge to the major cutting edge defines a cutting edge corner which includes a bevel inclined by an angle relative to a reference plane oriented perpendicular to the axis, wherein the angle is from 30 degrees to 60 degrees.

9. The shank milling cutter according to claim 8 wherein the angle is from 40 degrees to 50 degrees.

10. The shank milling cutter according to claim 1 wherein the minor cutting edge forms a clearance angle with a reference plane oriented perpendicular to the axis, wherein the clearance angle is at least 1 degree.

11. The shank milling cutter according to claim 10 wherein the clearance angle is from 1.5 degrees to 10 degrees.

12. The shank according to claim 10 wherein the clearance angle is from 2.5 degrees to 10 degrees.

13. The shank according to claim 1 wherein the cutting portion at least partially comprises hard metal.

14. The shank according to claim 1 wherein the cutting portion at least partially comprises one of cermet, PCD, CBN, or SiN.

15. The shank milling cutter according to claim 1 comprising an end milling cutter.

* * * * *